(12) United States Patent
Tsuboi et al.

(10) Patent No.: US 6,263,380 B1
(45) Date of Patent: Jul. 17, 2001

(54) MEASUREMENT DATA PROCESSING UNIT

(75) Inventors: Masashi Tsuboi; Norihide Tsuyuki; Kazushi Noguchi, all of Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/168,969

(22) Filed: Oct. 9, 1998

(30) Foreign Application Priority Data

Oct. 14, 1997 (JP) .................................................. 9-280385
Oct. 21, 1997 (JP) .................................................. 9-288489

(51) Int. Cl.[7] .............................. G06F 12/06; G06F 11/22
(52) U.S. Cl. ...................... 710/4; 710/3; 710/9; 714/43; 714/44; 340/825.52
(58) Field of Search ................................. 710/2–4, 10, 9, 710/18; 340/825.07, 825.52; 714/25, 37, 47–49, 799, 43

(56) References Cited

U.S. PATENT DOCUMENTS

| | | | |
|---|---|---|---|
| 4,380,052 | * 4/1983 | Shima .................. | 710/104 |
| 5,058,080 | * 10/1991 | Siems et al. ........... | 367/79 |
| 5,117,494 | * 5/1992 | Costes et al. .......... | 714/4 |
| 5,204,669 | * 4/1993 | Dorfe et al. ........... | 340/825.52 |
| 5,623,610 | * 4/1997 | Knoll et al. ........... | 710/101 |
| 5,884,086 | * 3/1999 | Amoni et al. .......... | 713/300 |
| 5,933,611 | * 8/1999 | Shakkarwar ............ | 710/126 |

* cited by examiner

Primary Examiner—Thomas Lee
Assistant Examiner—Ilwoo Park
(74) Attorney, Agent, or Firm—Oliff & Berridge PLC

(57) ABSTRACT

In a measurement data processing unit having a plurality of relaying unit to which one or more measuring device can be connected and processing means for collecting and processing the measurement data transmitted from said relaying unit, the plurality of relaying unit are connected to said processing means in sequence, and each relaying unit has an address-transmitting means for setting an address data by adding a number of measuring device connected to the respective relaying unit to another address data transmitted from a preceding relaying unit and for transmitting the newly set address data to a succeeding relaying unit.

6 Claims, 8 Drawing Sheets

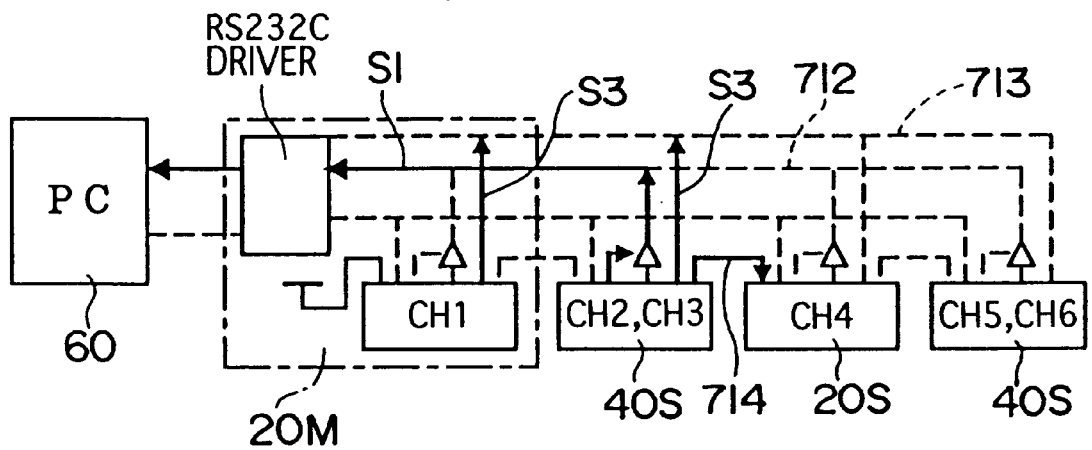
F I G. 9
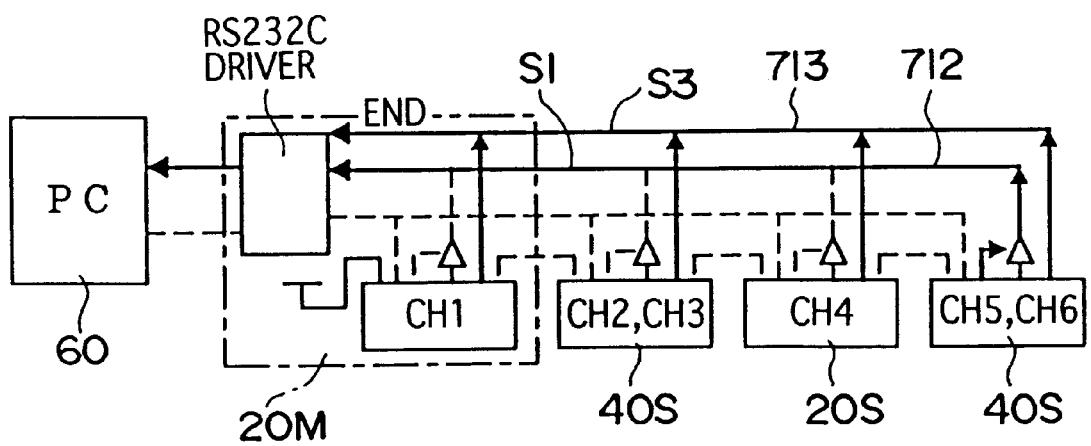
F I G. 10

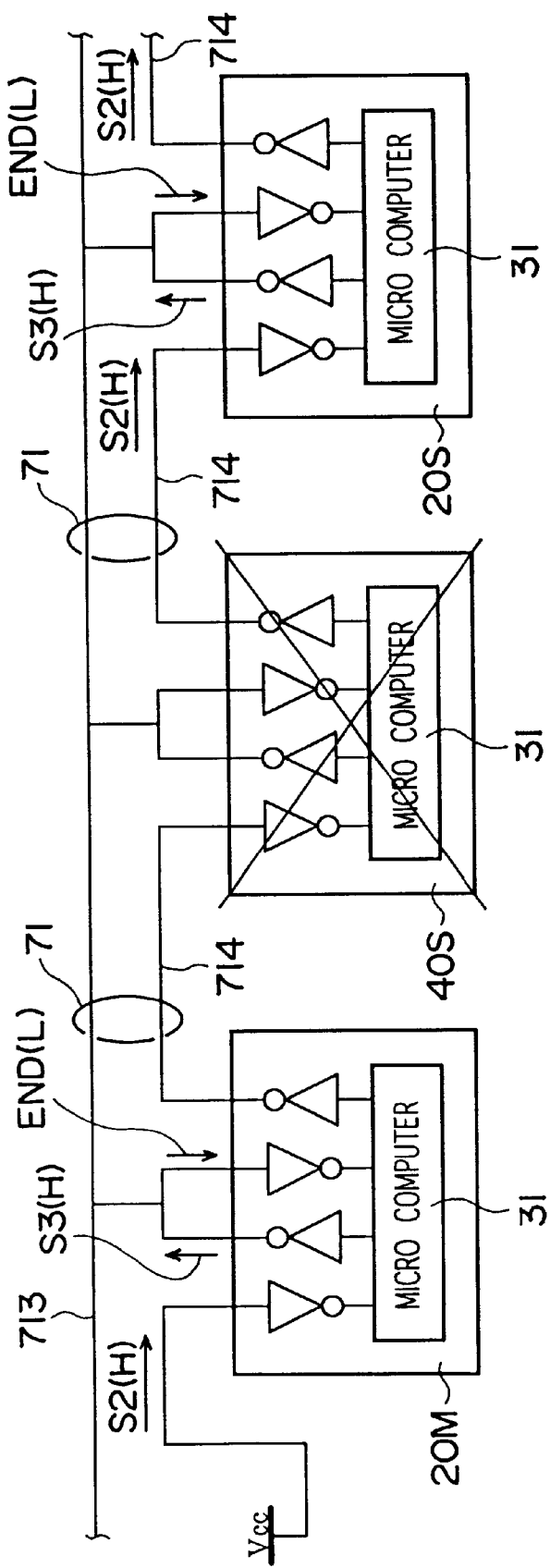
F I G. 12

MEASUREMENT DATA PROCESSING UNIT

BACKGROUND OF THE INVENTION

1. Field of the Invention

The present invention relates to a measurement data processing unit having a plurality of relaying unit to which one or plurality of measuring device can be connected and processing means for collecting and processing measurement data sent from the relaying unit.

2. Description of Related Art

Conventionally, a measuring device which detects measurement value as an electric signal by an optical or electrostatic detecting means is known for measuring a physical amount such as a length of a work.

For such a measuring device, for example, a digital dial gauge is known. The digital dial gauge has a gauge body, a spindle slidably attached to the gauge body and a detecting means including a stationary detecting element mounted to the gauge body and a movable detecting element moving synchronously with the sliding movement of the spindle, and detects a relative movement displacement amount of the two detecting element as an electric signal.

The electric signal detected by the digital dial gauge is not only digitally displayed to a display unit directly connected to the digital gauge but also processed to be displayed and recorded by a measurement data processing unit.

[Measurement data processing unit]

In using the measurement data processing unit, the relaying unit is connected to the digital dial gauge, the measurement data is transmitted to processing means such as a personal computer through the relaying unit, and the measurement data is processed by the processing means. The relaying unit here is for transmitting the electric signal sent from the digital dial gauge after converting to be adapted to the processing means, to which one or two digital gauge is usually connected per one relaying unit. In collecting and processing the measurement data sent from a plurality of digital dial gauge, the measurement data is transmitted through a plurality of the relaying unit connected to the processing means.

According to the measurement data processing unit having the measuring device, the relaying unit and the processing means, less work is necessary even in providing a plurality of measuring device to a work to be measured since measurement process is simultaneously carried out by a single processing means. Therefore, in examining a processing precision of a work, simultaneous plural spot measurement can be conducted employing a plurality of measuring device. Accordingly, a deviation against a standard block can be simultaneously confirmed at a plurality of measurement point, thereby diminishing the burden of examining the work.

However, in connecting the measuring device and the processing means through a plurality of the relaying unit of aforementioned processing unit of the measurement data, following problem occurs since all of the relaying unit have to be individually connected to the processing means.

[Problem of address setting]

In the simultaneous plural spot measurement, the measurement data transmitted from the respective measuring device is collected to the processing means. In this case, to secure memory area corresponding to the respective measuring device, address setting for calibrating the memory area and the measuring device has to be carried out. The address setting is determined by connecting condition of the processing means and the relaying unit, and the measurement data of respective measuring device is allocated to each corresponding memory area determined by which relaying unit should be connected to a plurality of I/O port (input/output port) provided to the processing means.

Accordingly, the address setting inevitably accompanies human works of connecting the processing means and the relaying units. And as the measuring device increases, the address setting becomes complicated.

Furthermore, as the measuring device increases, mistake in connection is likely to occur since the number of connection line between the relaying unit and the calculating unit increases. If such mistake occurs, precise collection and process of the processing means is impossible.

[Problem of expansion]

The number of measurement data capable of collecting and processing by a single processing means, in other words, the number of measuring device capable of being connected to a processing means is determined by the number of I/O port provided to the processing means and the number of measuring device capable of being connected to the relaying unit. Accordingly, if further measuring device is required when all the I/O ports are connected to the relaying units, it is necessary to newly provide an I/O port, resulting in difficulty in expanding aforementioned measurement data processing unit.

[Easy-to-extend series connection and problem therewith]

In measurement data processing unit capable of simultaneous plural spot measurement, a device has been developed to facilitate increasing measuring device, in which respective relaying unit is serially connected to adjacent preceding and succeeding relaying unit, and a relaying unit disposed at an end of the line is connected to the processing means through general communication cable such as RS232C.

The measurement data converted into an electric signal by a measuring device is transmitted from the relaying unit to which the measuring device is connected to the processing means, through precedingly disposed relaying unit and cable to the processing means, and through a communication cable from a relaying unit disposed at the end of the cable.

According to aforementioned processing unit of measuring data, each relaying unit is serially connected with each other, and one of the relaying unit is connected to the processing means. So, a new measuring device can be easily installed by serially connecting another relaying unit to the serially connected relaying units and connecting a measuring device to the new relaying unit, thereby constructing easy-to-expand measurement data processing unit.

However, since not all of the relaying units are connected one-to-one to the processing means in the aforementioned measurement data processing unit, it is difficult to immediately specify troubled part by processing means when a part of relaying unit go wrong or the cable connecting adjacent two relaying unit comes down.

It is an object of the present invention to provide a processing unit capable of automatically conducting address setting in a measurement data processing unit having plurality of relaying unit to which one or plurality of measuring device can be connected and processing means for collecting and processing the measurement data transmitted from the relaying units.

It is another object of the present invention to provide a measurement data processing unit capable of easily installing new measuring device.

It is further object of the present invention to provide a measurement data processing unit having relaying units serially connected through a communication cable which is capable of immediately identifying troubled section if the measurement data processing unit should break down.

SUMMARY OF THE INVENTION

A measurement data processing unit according to the present invention has a plurality of relaying unit to which one or more measuring device can be connected and processing means for collecting and processing the measurement data transmitted from said relaying unit. The measurement data processing unit is characterized in that the plurality of relaying unit are connected to said processing means in sequence, and each relaying unit has an address-transmitting means for setting an address data by adding a number of measuring device connected to the respective relaying unit to another address data transmitted from a preceding relaying unit, and for transmitting the newly set address data to a succeeding relaying unit.

According to the present invention, since each relaying unit has an address-transmitting means, and sets individual address data after adding the number of the measuring device connected to respective relaying unit thereby transmitting the address data to the succeeding relaying unit, the number of the measuring device connected to the plurality of the relaying unit can be recognized in succession, thereby automating address setting on the processing means.

(Series connection)

In the present invention, it is preferable that aforementioned respective relaying unit is series connected to the preceding and succeeding relaying unit through a cable, and one of the series connected relaying units is connected to the processing means.

Since the measurement data processing unit has above-described structure, the unit can be expanded only by connecting a new relaying unit to a relaying unit disposed at the end of the plurality of the series connected relaying unit and connecting additional measuring device to the newly connected relaying unit.

(Pseudo series connection by transmitting-line)

In the present invention, it is preferable that the measurement processing unit has a measurement-data line and a command-data-line connecting said each relaying unit to said processing means in parallel, and a transmitting-line connecting adjacent each relaying units to report completion of data-transmission of the preceding relaying unit to the succeeding relaying unit in sequence, In the above, the address-transmitting means preferably includes an data-acquiring means for acquiring the address data of the preceding relaying unit through the measurement-data line, a setting means for setting an individual address data by adding the number of measuring device connected to the individual relaying unit, and a transmitting means for transmitting the newly set address data to the measurement-data line and for transmitting a transmission-completion signal to the succeeding relaying unit through the transmitting line after transmitting the newly set address data. Further, it is preferable that the data-acquiring means starts acquiring the address data under the condition that the transmission-completion signal is received from the preceding relaying unit through the transmitting-line.

According to the above structure, though each relaying unit is connected in parallel with regard to the measurement-data line and command-data-line, the relaying units can be handled as pseudo-series connection.

In other words, since each relaying unit starts acquiring address data on condition that the transmission-completion signal is received from the preceding relaying unit, the address data can be transmitted to the processing means precisely and securely.

Further, since the transmission completion command is transmitted only to the adjacent succeeding relaying unit, the relaying unit does not mistakenly acquire the address data, thereby achieving reliable receipt of the address data And since the address data is transmitted through the measurement-data line connecting each relaying unit in parallel to the processing means, the address data can be easily obtained by the processing means. And connecting line structure of the measurement data processing unit can be simplified by utilizing the measurement-data line which transmits measurement data when measuring.

It is preferable that the aforementioned processing means and the respective relaying unit is connected through a data-transmission-identifying-line to which a transmission-identifying signal of the address data from respective relaying unit, and the processing means has a execution means for collecting and processing the measurement data on condition that all of the transmission-identifying signal is received from the relaying units.

Accordingly, since the execution means is actuated on condition that the processing means receives the transmission-identifying signal, the measurement data can be collected and processed automatically, and the consecutive process from address setting and initiation of measurement can be simplified.

In the above, when the plurality of relaying units is series connected through a cable and one of the relaying unit and the processing means is connected through a communication cable, it is preferable that the transmission-identifying signal is transmitted through a part of the measurement line of the communication cable.

In this case, since the transmission-identifying signal is transmitted through the measurement-data line, the number of the signal line of the communication cable can be reduced.

(Transmitting-line-abnormality detecting means)

Preferably, each of the relaying unit has a transmitting-line-abnormality detecting means for detecting an abnormality of the preceding relaying unit or the cable from a condition of the transmission-completion signal.

The aforementioned transmission-completion signal is, in short, a selective signal such as a digital signal of 0 and 1, and it is possible for the signal to output two types of voltage of high and low.

Specifically, when each of the relaying units has not transmitted the measurement data yet, the low signal value of voltage output ("Low") is transmitted to the adjacent succeeding relaying unit. And high signal value of voltage output ("High") is transmitted after transmitting the measurement data.

The aforementioned transmitting-line-abnormality detecting means receives a signal value ("Low" or "High") of the transmission-completion signal transmitted from the preceding relaying unit to detect abnormality in the preceding relaying unit or the cable in accordance with the functioning condition of the measurement processing unit.

Accordingly, it is preferable that the transmitting-line-abnormality detecting means is provided with an data-acquiring part for receiving the transmission-completion signal, memory for memorizing the acquired transmission-completion signal and judging part for determining the abnormality of the transmission-completion signal based on the functioning condition of the measurement data processing unit.

According to the present invention described above, each relaying unit has transmitting-line-abnormality detecting means. So, when an abnormality is caused on the preceding relaying unit or cable, the adjacent succeeding relaying unit detects the abnormality, and immediately specifying the malfunction part of the measurement data processing unit.

It is further preferable that the transmitting-line-abnormality detecting means is provided with an error signal output portion for conveying an abnormality to the processing means through the aforementioned measurement-data line.

According to the above, it is possible to convey the aforementioned relaying unit abnormality to the processing means due to the presence of the error signal output portion, thereby facilitating to specify the breakdown part by the processing means.

(Identifying-line-abnormality detecting means)

The measurement data processing unit according to the invention may further include a data-transmission-identifying-line connecting each of the relaying unit to said processing means in parallel for transmitting a transmission-identifying signal to switch signal value on condition that the measurement data is transmitted from all of the relaying unit.

In the above, it is preferable that the aforementioned each relaying unit is provided with an identifying-line-abnormality detecting means for detecting an abnormality of the other relaying unit or the cable from the condition of the transmission-identifying signal so that one of the preceding relaying unit and the cable is abnormal is determined by combining a detected condition of the transmitting-line-abnormality detecting means and the identifying-line-abnormality detecting means.

The identifying-line-abnormality detecting means is preferably provided with an data-acquiring part, memory and judging part like the aforementioned transmitting-line-abnormality detecting means, and more preferably, further provided with error signal output portion.

Specifically, the abnormality detection by the aforementioned transmitting-line-abnormality detecting means and the identifying-line-abnormality detecting means is carried out in accordance with the signal value ("Low", "High") of the transmission-identifying signal, as follows.

First, when each relaying unit is waiting for a command from the processing means and when the transmitting-line-abnormality detecting means of a relaying unit detects a "High" transmission-completion signal reporting that measurement data is transmitted, the abnormality detecting means of the relaying unit determines abnormality of the preceding relaying unit or the cable.

Second, when the measurement data is transmitted from the preceding relaying unit and when the identifying-line-abnormality detecting means of the preceding relaying unit detects a "High" transmission-identifying signal reporting that all measurement data are transmitted, the identifying-line-abnormality detecting means detects an abnormality of the other, i.e. succeeding relaying unit or the cable.

Third, a malfunction of the cable is determined by above result of the first and the second detection.

According to aforementioned malfunction detecting system, the breakdown part of the measurement data processing unit can be securely specified as described above, since the malfunction detecting system is provided with the transmitting-line-abnormality detecting means and the identifying-line-abnormality detecting means.

And since the transmitting-line-abnormality detecting means and the identifying-line-abnormality detecting means are provided with the error signal output portion, above malfunction determination can be automatically conducted by the processing means such as a personal computer, thereby further facilitating the use of the measurement data processing unit.

BRIEF DESCRIPTION OF THE DRAWINGS

FIG. 9 is a diagram showing a state that a measurement data is sent from a slave unit according to the aforementioned embodiment;

FIG. 10 is a diagram showing a state that a measurement data is sent from all of the relaying units according to the aforementioned embodiment;

FIG. 12 is a diagram showing a breakdown of the measurement data processing unit by a malfunction of the slave unit according to the aforementioned embodiment.

DETAILED DESCRIPTION OF THE PREFERRED EMBODIMENT(S)

The preferred embodiment of the present invention is described below with reference to drawings.

Figure 1:
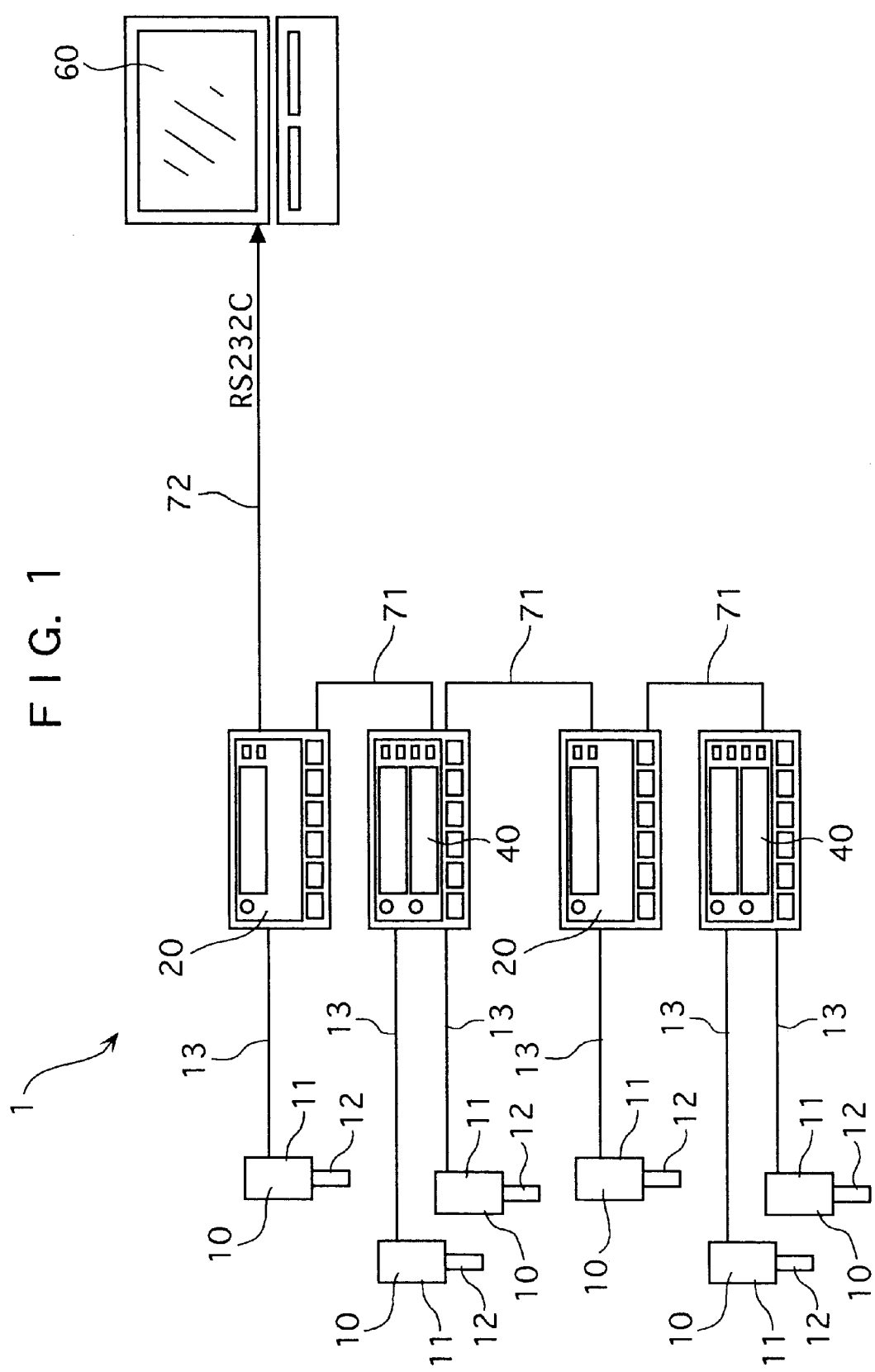
FIG. 1 is a front elevational view of a measurement data processing unit according to a preferred embodiment according to the present invention.

FIG. 1 shows a measurement data processing unit 1 according to the preferred embodiment of the present invention.

The measurement data processing unit 1 has six digital dial gauge 10 as a measuring device, and is provided with a personal computer 60 as a processing means for collectively gathering and processing a measurement data sent from the six digital dial gauge 10.

A plurality of relaying unit 20M, 20S and 40S serially connected with each other are disposed between the digital dial gauges 10 and the personal computer 60. The plurality of relaying unit 20M, 20S and 40S includes a master unit 20M disposed at the end of the group of relaying units and connected to the personal computer 60 through a RS 232C cable as a communication cable, and slave units 20S and 40S successively connected behind the master unit 20M.

Here, the master unit 20M and the slave unit 20S differ only in their connection of the cable 71 and the RS232C cable 72, and are identical in the respective inner structure.

The slave unit 20S and the slave unit 40S differ in number of connectable digital dial gauge 10 per one unit. One digital dial gauge 10 can be connected to one slave unit 20S and two digital dial gauges 10 can be connected to one slave unit 40S.

The digital dial gauge 10 has a gauge body 11 and a spindle 12 slidably provided to the body 11, and the gauge body 11 accommodates a detecting means therein side including a stationary detecting element attached to the body 11 and a movable detecting element moving synchronously with the movement of the spindle.

A relative displacement amount of the body 11 and the spindle 12 is converted into an electric signal by the detecting means, which is transmitted to each relaying unit 20M, 20S and 40S through a connection cable 13, and further to the personal computer 60 through the cable 71 and the RS232C cable 72.

(Cable)

Figure 2:
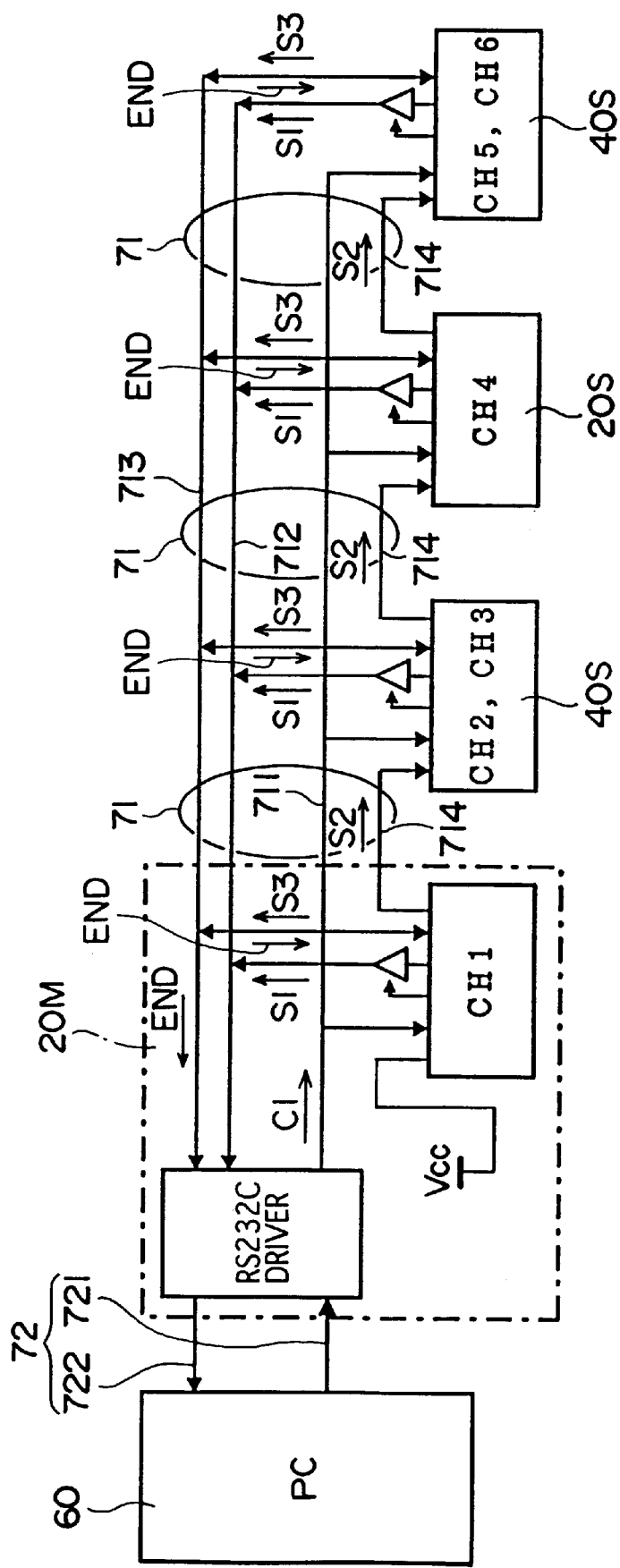
FIG. 2 is a diagram showing a connection line between a processing means and a relaying unit according to the aforementioned embodiment.

As shown in FIG. 2, the cable 71 has a plurality of transmit-receive line. Specifically, a command-data-line 711 which connects each relaying unit 20M, 20S and 40S in parallel to the personal computer 60, measurement-data line 712, data-transmission-identifying-line 713, and transmitting-line 714 which connects between the master unit 20M and the slave unit 40S and between the two adjacent slave unit 20S and 40S.

The RS232C cable 72 connecting the personal computer 60 and the master unit 20M has a control line 721 and a detection line 722.

The command-data-line 711 conveys command C1 as a control signal through the control line 721 of the RS232C cable 72 from the personal computer 60 to each relaying unit 20M, 20S and 40S. A measurement data S1 of the digital dial gauge 10 (not shown in FIG. 2) connected to each relaying unit 20M, 20S and 40S can be transmitted, or zero-point adjustment and span adjustment can be carried out by transmitting the command C1 from the personal computer 60.

The measurement-data line 712 is for transmitting the measurement data S1 which is transmitted by each digital dial gauge 10 as a measurement value to the personal computer 60 through each relaying unit 20M, 20S and 40S. An address data mentioned below is also transmitted through the measurement-data line 712.

A transmission-identifying signal S3 is a selective signal showing whether the measurement data S1 is transmitted or not, and is two kinds of voltage output signal of high and low. In other words, the transmission-identifying signal S3 shows a low voltage output signal value (hereinafter referred to as "Low") when the measurement data S1 is transmitted, and the transmission-identifying signal S3 shows a high voltage output signal value (hereinafter referred to as "High") when the measurement data S1 is not transmitted.

The data-transmission-identifying-line 713 which conveys the transmission-identifying signal S3 is wired-or, and a transmission-identifying signal END which shows completion of transmitting all data is conveyed to the personal computer 60 and each relaying unit 20M, 20S and 40S when the transmission-identifying signal S3 from all of the relaying units 20M, 20S and 40S shows High.

Specifically, when any one of the plurality of relaying unit 20M, 20S and 40S is transmitting measurement data S1 and the transmission-identifying signal S3 shows Low, the transmission-identifying signal END shows Low. When all of the measurement data S1 is completed to be transmitted, the transmission-identifying signal END shows "High".

The transmission line 714 is, as to the master unit 20M and the slave unit 40S connected thereafter for example, for transmitting transmission-completion signal S2 to the succeeding slave unit 40S when all the measurement data S1 is transmitted from the master unit 20M.

Similar to aforementioned transmission-identifying signal S3, the transmission-completion signal S2 is also a selective voltage output signal indicating whether transmission is completed or not. When the master unit 20M does not complete transmitting measurement data S1, the master unit 20M transmits the "Low" transmission-completion signal S2 to the slave unit 40S. When transmitting the measurement data S1 is completed, the master unit 20M transmits "High" transmission-completion signal S2.

As described above, the signal values of the transmission-completion signal S2, transmission-identifying signal S3 and transmission-identifying signal END change according to transmitting condition of the master unit 20M, the slave unit 20S and the slave unit 40S. More specifically, the signal value changes as shown in Table 1.

TABLE 1

| Condition of Relaying unit | Unit type | Input S2 | Output S2 | Output S3 | Input END |
|---|---|---|---|---|---|
| Waiting for a command from personal computer | Master unit | High | Low | High | High |
| | Slave unit | Low | Low | High | High |
| Transmitting measurement data | Master unit | High | Low | Low | Low |
| | Slave unit | Low | Low | Low | Low |
| Completing transmission of measurement data | Master unit | High | High | High | Low |
| | Slave unit | High | High | High | Low |
| Completing transmission of whole data | Master unit | High | Low | High | High |
| | Slave unit | High | Low | High | High |

(Relaying unit)

Figure 3:
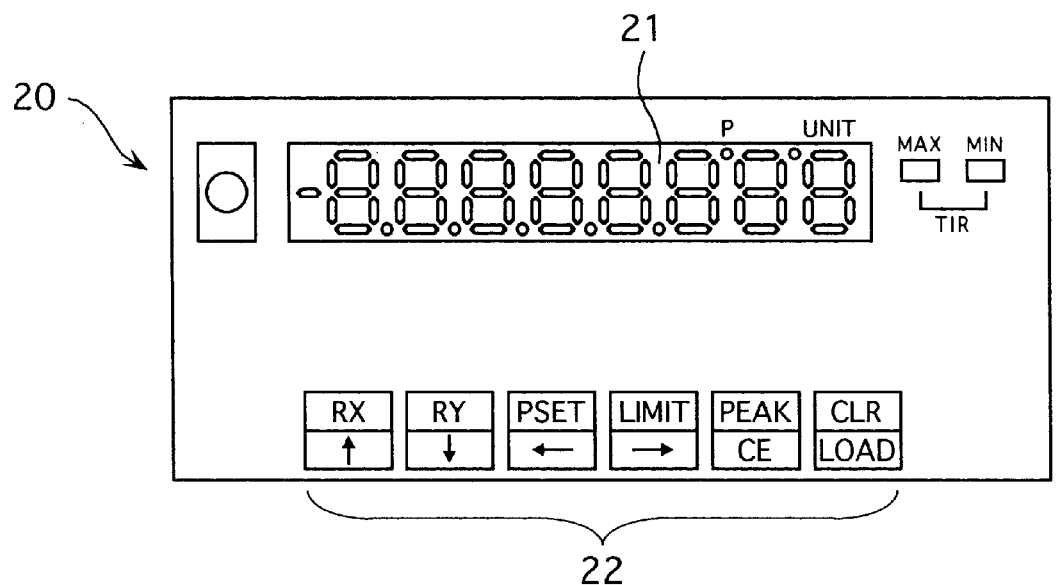
FIG. 3 is a front elevational view showing the appearance of the relaying unit according to the aforementioned embodiment.

The master unit 20M has a rectangular solid outer case, and, as shown in FIG. 3, the outer case is provided with a display 21 capable of displaying 8 digit figures by light-emitting diodes, and touch key panel 22 for conducting zero-adjustment of the connected digital dial gauge 10 and limit adjustment by the relaying unit 20M solely.

Figure 4:
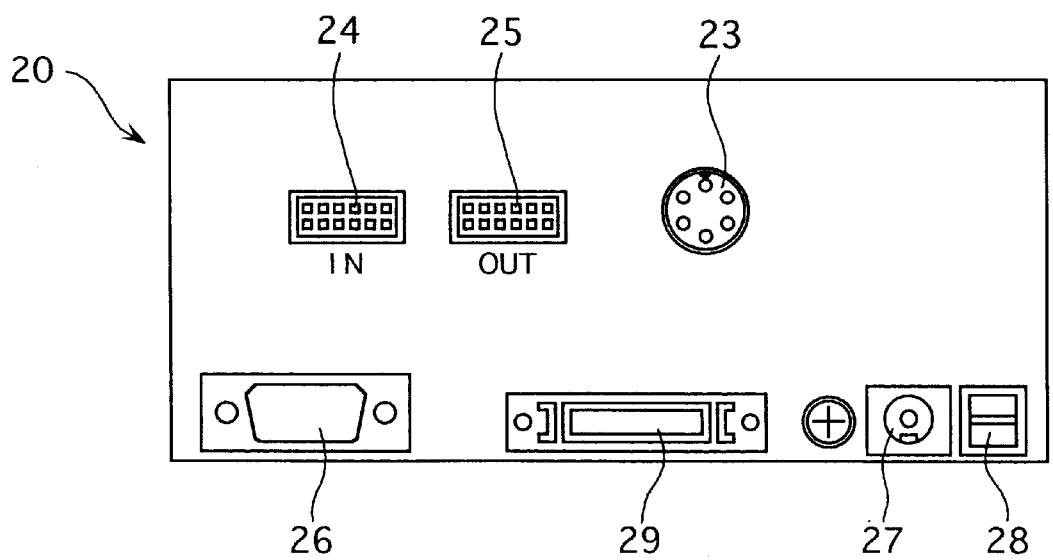
FIG. 4 is a rear elevational view showing the appearance of the relaying unit according to the aforementioned embodiment.

On the rear side of the relaying unit 20M, as shown in FIG. 4, a gauge input connector 23 for connecting the connection cable 13, an RS linking input terminal 24 and an RS linking output terminal 25 for connecting the cable 71 connecting the relaying unit 20M, 20S and 40S with each other, an RS232C connector 26 for connecting the RS232C cable 72, DC adapter-connecting terminal 27, and on/off switch 28. Incidentally, an output terminal 29 consisted of half-36-pin connector for connecting a printer or the like is provided to the relaying unit 20M to print out the measurement data directly.

Figure 5:
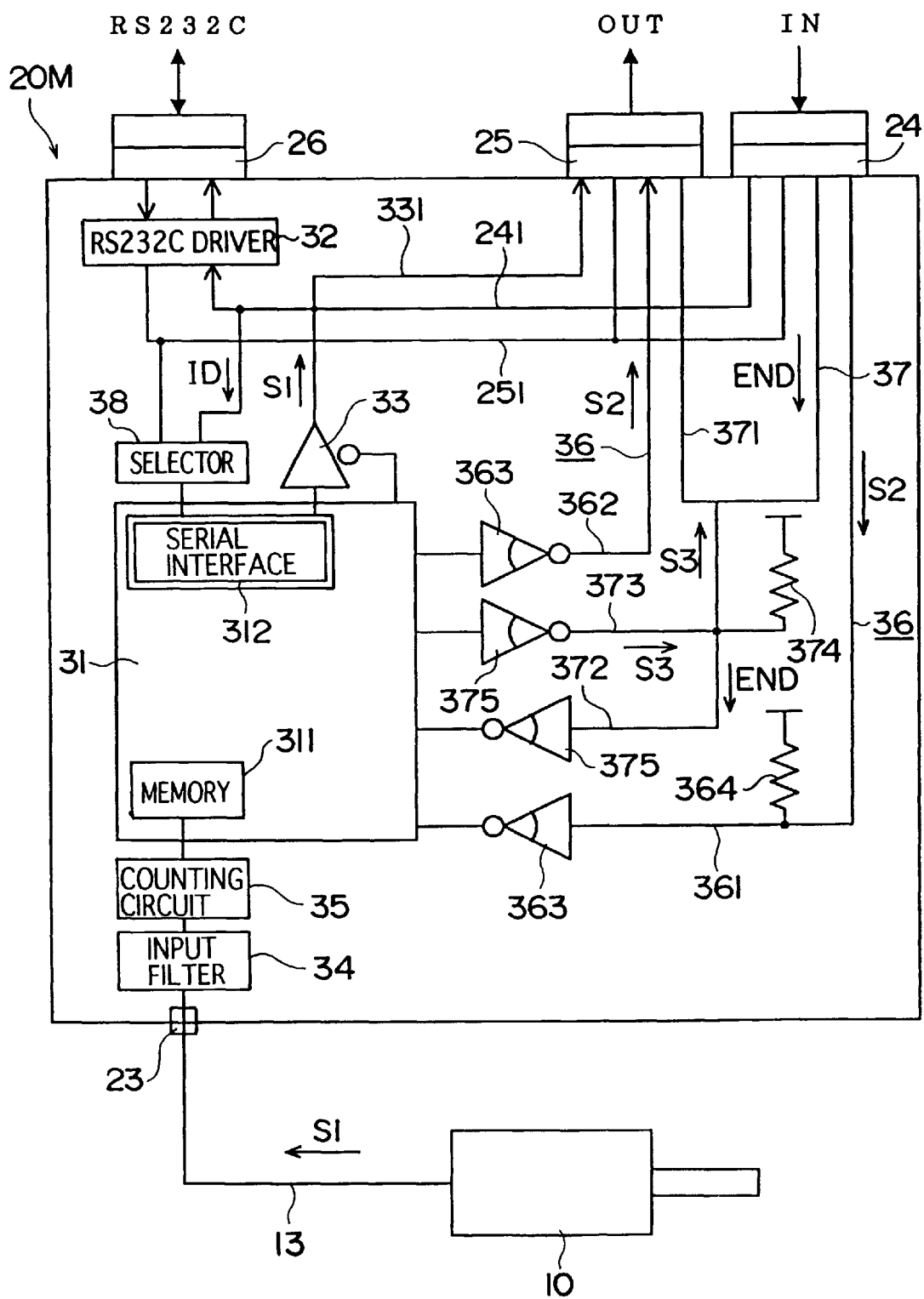
FIG. 5 is a diagram showing inner structure of the relaying unit according to the aforementioned embodiment.

The relaying unit 20M has an inner structure shown in a circuit diagram of FIG. 5, in which the gauge input connector for the connection cable 13 to be connected is connected to the RS232C connector 26, RS linking input terminal 24 and RS linking output terminal 25 through a microcomputer 31.

The RS linking input terminal 24 and the RS linking output terminal 25 is connected to the RS232C connector 26 through wiring 241 and 251, thereby sending a signal input and output to the RS232C connector to the RS linking input terminal 24 and RS linking output terminal 25 without the intervening microcomputer 31 inside the relaying unit 20M.

The microcomputer 31 has a memory 311 for receiving and recording the measurement data S1 from the digital dial gauge 10, a serial interface 312 for directly transmitting the measurement data S1 recorded in the memory 311 through the RS232C cable 72 and an operating part (not shown in the FIG. 5) for controlling the measurement data S1 retained in the memory 311.

Incidentally, an RS232C driver 32 for converting an electric signal output by the microcomputer 31 is disposed between the serial interface 312 and the RS232C connector 26.

A three-state buffer 33 is set to the microcomputer 31 for transmitting the measurement data S1 from the RS linking output terminal 25, and the output of the three-state buffer 33 is connected to the RS linking output terminal 25 by a wiring 331.

A selector 38 is provided between the serial interface 312 and the RS232C driver 32 to switch a data signal sent from the personal computer 60 and address signal.

An input filter 34 and a counting circuit 35 are disposed between the microcomputer 31 and the gauge input connector 23 to remove a noise of an electric signal of the measurement data S1 transmitted from the digital dial gauge 10 for pulse modulation.

The microcomputer 31 has a first circuit 36 for inputting/outputting the transmission-completion signal S2 to the microcomputer 31, and a second circuit 37 for inputting/outputting the transmission-identifying signal S3 to the microcomputer 31.

The first circuit 36 is provided with an input wiring 361 for connecting the RS linking input terminal 24 and the microcomputer 31, and an output wiring 362 for connecting the RS linking output terminal 25 and the microcomputer 31. An inverter 363 for inversely converting signal input and output is provided at an intermediate portion of each wiring 361 and 362. Further, a resistor 364 for applying voltage to the inverter 363 is provided to an intermediate part of the input wiring 361.

The second circuit 37 includes a first wiring 371 for linking the RS linking input terminal 24 and the RS linking output terminal 25, a second wiring 372 diverging from the first wiring for inputting the transmission-identifying signal END to the microcomputer 31, a third wiring 373 for outputting transmission-identifying signal S3 sent from the microcomputer 31 to the first wiring 371, and a resistor 374 for applying a predetermined voltage to the first wiring 371 in the absence of output signal from the third wiring 373. An inverter 375 is disposed between the second wiring 372 and the third wiring 373.

Incidentally, the second wiring 372 is provided for supervising the condition of the other relaying unit 20S and 40S by transmission-identifying signal END of data-transmission-identifying-line 713.

In the relaying unit 20M, a data-acquiring means for acquiring the preceding address data is consisted of a serial interface 312 on the microcomputer 31 and a wiring 241 connected to the serial interface 312.

And a transmitting means for outputting an address data and transmission-completion signal to the succeeding unit is consisted of the three-state buffer 33 and wiring 331 and 241.

Incidentally, a setting means for setting the inner address of the relaying unit 20M is provided to the operating part of the microcomputer 31.

(Abnormality detecting means)

A transmitting-line-abnormality detecting means includes the first circuit 36 for inputting and outputting the transmission-completion signal S2, and the operating part of the microcomputer 31 for determining abnormality based on the input signal value to the first circuit 36.

A identifying-line-abnormality detecting means includes a second circuit 37 for inputting and outputting transmission-identifying signal S3, and the operating part of the microcomputer 31 for determining abnormality based on the input signal value to the second circuit 37.

The aforementioned transmitting-line-abnormality detecting means and identifying-line-abnormality detecting means has an error signal output portion for outputting error signal to the outside, which is consisted of the three-state buffer 33 connected to the measurement-data line 712 specifically.

And though not shown in the FIG. 5, the error signal is also outputted to the display 21 in front of the relaying unit 20M and an error message is displayed to the display 21 simultaneously with a breakdown.

The relaying unit 40S capable of connecting two digital dial gauges 10 has almost the same inner structure as the relaying unit 20M. However, since two gauge input connectors 23 are provided, the input filter 34 and the counting circuit 35 is increased. And the memory 311 on the microcomputer 31 is also divided into two memory areas in the relaying unit 40S, and respective measurement data from the digital dial gauges 10 are stored in respective memory area.

(Signal flow)

Flow of various electric signals in the aforementioned master unit 20M and the slave unit 20S and 40S is described below.

(1) Flow of measurement data

The measurement data S1 transmitted from the digital dial gauge 10 is inputted to the gauge input connector 23 from the connection cable 13, and is stored in the memory 311 on the microcomputer 31 through the input filter 34 and the counting circuit 35.

When the microcomputer 31 acknowledges input of the transmission-completion signal S2, the microcomputer 31 outputs the measurement data S1 from the three-state buffer 33, which is output to outside of the unit from the RS linking output terminal 25 or the RS232C connector 26 through wiring 331.

(2) Flow of transmission-completion signal

The transmission-completion signal S2 is conveyed from the RS linking input terminal 24 to the microcomputer 31 through the input wiring 361 and the inverter 363 of the first circuit 36.

Once the microcomputer 31 recognize that the signal value of the transmission-completion signal S2 is "High" (initial applied voltage Vcc), the microcomputer 31 outputs the measurement data S1 from the three-state buffer 33.

After completing the transmission of the measurement data S1, the signal value of the transmission-completion signal S2 is switched to "High" by the microcomputer 31 and the inverter 363, and the transmission-completion signal S2 is transmitted from the RS linking output terminal 25 to report the completion of the transmission of the measurement data S1 to the succeeding slave unit 20S and 40S.

(3) Flow of transmission-identifying signal

The transmission-identifying signal S3 is conveyed from the RS linking input terminal 24 to the microcomputer 31 through the first wiring 371, second wiring 372 and the inverter 375 of the second circuit 37.

Similarly to the above, after completing the transmission of the measurement data S1, the microcomputer 31 switched the signal value of the transmission-completion signal S2 to "High", and the transmission-identifying signal S3 is transmitted from the RS linking output terminal 25 through the inverter 375, the third wiring 373 and the first wiring 371 (Address setting)

Figure 6:
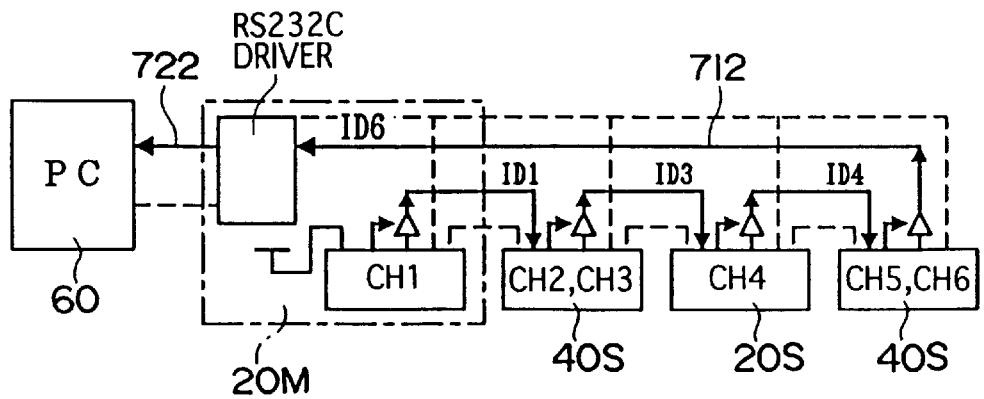
FIG. 6 is a diagram showing a routine for setting an address of the measurement data processing unit according to aforementioned embodiment.

Next, a process for setting addresses automatically with the use of the aforementioned relaying units 20M, 20S and 40S (with reference to FIG. 5 and 6).

(1) When the switch of the personal computer 60 and the on/off switch of all the relaying unit 20M, 20S and 40S is set ON, the master unit 20M to which RS232C cable 72 is connected detects that nothing is connected to the RS linking input terminal thereof by the initial applied voltage Vcc. And after setting the address data ID (1) in view of the number of the digital dial gauge connected thereto, the master unit 20M transmit the address data ID (1) to the measurement-data line 712.

After transmitting the address data ID (1), the transmission-completion signal S2 is transmitted to the transmitting-line 714 to report the completion of transmitting the address data ID (1) to the succeeding slave unit 40S.

(2) The succeeding (second stage) slave unit 40S acquires the address data ID (1) on receiving the transmission-completion signal S2 through the transmitting-line 714. Incidentally, the address data ID (1) is conveyed to the microcomputer 31 from the wiring 241 through the serial interface 312 and the selector 38.

The (second stage) slave unit 40S adds the number of the digital dial gauge 10 connected thereto (2) to the address data ID (1), thereby setting new address data ID (3) to transmit the newly set address data ID (3) to the measurement-data line 712.

(3) After the last (fourth stage) slave unit 40S completed address setting, an address data ID (6) is transmitted to the personal computer 60 through the measurement-data line 712. The personal computer 60 determines a table structure for storing the data based on the address data ID (6) to secure memory area in accordance with the address of the respective digital dial gauge.

Incidentally, though not shown in the FIG. 6, after each relaying unit 20M, 20S and 40S transmits individual address data ID (1–6), the transmission-completion signal S2 is transmitted by each relaying unit and the transmission-identifying signal S3 is also transmitted to the data-transmission-identifying-line 713.

(Measurement process)

Practically, in the measurement data processing unit 1 with the address setting being completed, the measurement process is carried out as follows.

(1) When all the transmission-identifying signal S3 is transmitted to the data-transmission-identifying-line 713 in the aforementioned address setting, the transmission-identifying END informing the completion of the address setting is transmitted to the personal computer 60, the relaying unit 20M, 20S and 40S (not shown in the FIG. 6).

(2) An execution means set in the personal computer 60 is started when the personal computer 60 receives the transmission-identifying signal END.

Figure 7:
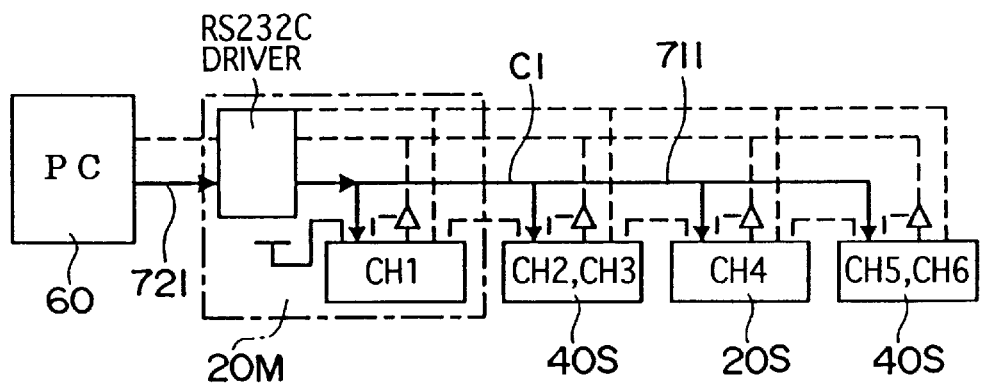
FIG. 7 is a diagram showing a state that a control signal is sent from the processing means to respective relaying units according to the aforementioned embodiment.

(3) First, a command C1 for setting the measuring condition of each relaying unit 20M, 20S and 40S is conveyed to all the relaying units 20M, 20S and 40S. Specifically, information such as zero-adjustment and span adjustment is conveyed as the command C1 (see FIG. 7).

(4) After completing zero-adjustment and span adjustment of each relaying unit 20M, 20S and 40S according to the command C1, each relaying unit 20M, 20S and 40S send a signal informing completion of initial setting to the personal computer 60.

Figure 8:
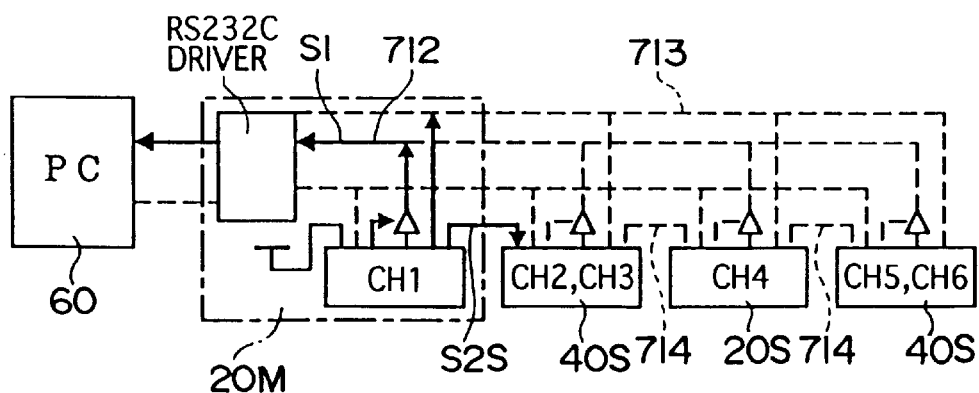
FIG. 8 is a diagram showing a state that a measurement data is sent from a master unit according to the aforementioned embodiment.

(5) After the personal computer 60 declares initiating measurement, the master unit 20M transmits the measurement data S1 of the digital dial gauge 10 to the personal computer 60 (see FIG. 8).

(6) Consequently, the transmission-completion signal S2 is transmitted to the succeeding slave unit 40S through the transmitting-line 714 after the signal S2 being set "High", and the transmission-identifying signal S3 is also transmitted to the data-transmission-identifying-line 713 after the signal S3 being set "High".

(7) When the slave unit 40S receives the transmission-completion signal S2, the slave unit 40S starts measurement to transmit the measurement data S1 to the personal computer 60. Simultaneously with the transmission of the measurement data, the slave unit 40S transmits transmission-completion signal S2 to the succeeding slave unit 20S, and also transmits transmission-identifying signal S3 to the data-transmission-identifying-line 713 after setting the signal S3 "High" (see FIG. 9).

Above step (3) and (4) is repeated so that the measurement data S1 is transmitted to the personal computer 60 in sequence from the master unit 20M to the lastly disposed slave unit 40S.

(8) When all of the measurement data S1 is transmitted, the transmission-identifying signal END of all the data-transmission-identifying-line 713 is set "High" (transmission completed) and is transmitted from the each relaying unit 20M, 20S and 40S to the personal computer 40S.

(9) When the personal computer 60 recognizes completion of measurement by the transmission-identifying signal END, the entire setting of the measurement data processing unit 1 is returned to initial condition.

(Malfunction detecting process)

Next, a malfunction detecting process of the aforementioned measurement data processing unit 1 is described below with reference to FIGS. 11 and 12.

Figure 11:
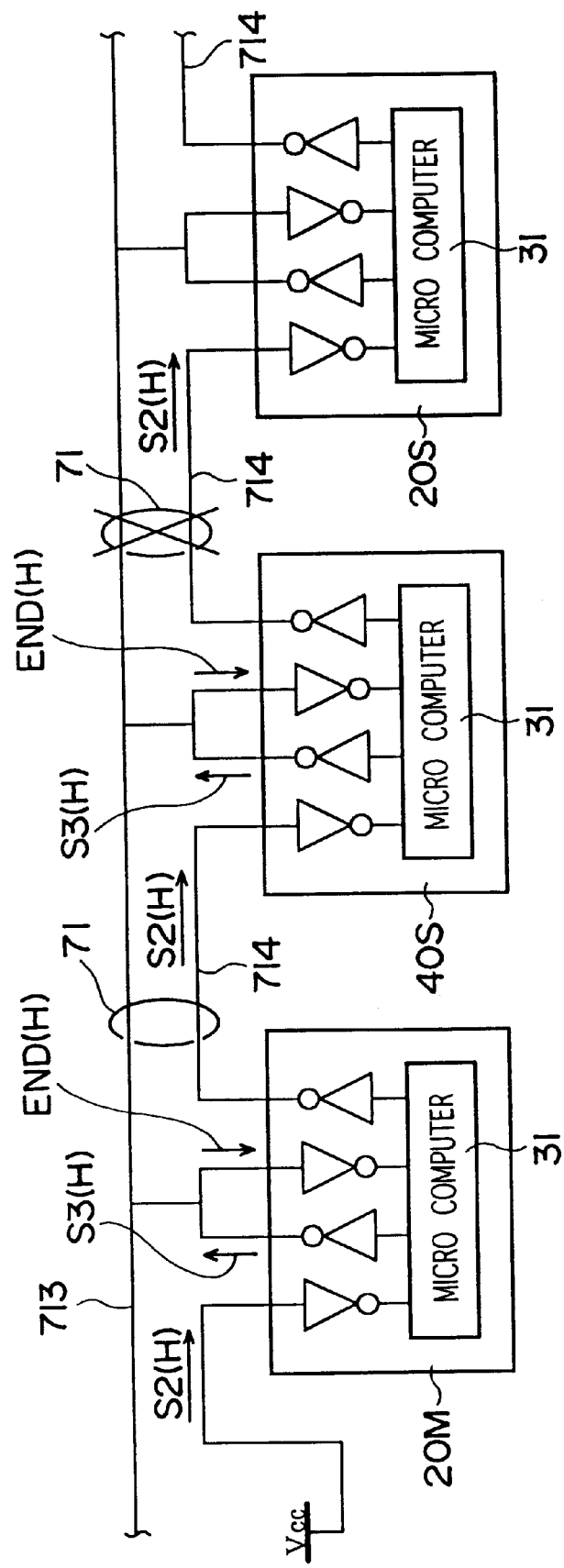
FIG. 11 is a diagram showing a breakdown of the measurement data processing unit by a cable being cut off according to the aforementioned embodiment.

When the cable 71 between the slave unit 40S (second stage) and the slave unit 20S (third stage) is cut off as shown in FIG. 11, the transmission-completion signal S2 and transmission-identifying signal S3 and END is represented as shown in Table 2 (the part different to the Table 1=erred part is emphasized with shadow).

TABLE 21

| Condition of Relaying unit | Unit type | Input S2 | Output S2 | Output S3 | Input END |
|---|---|---|---|---|---|
| Waiting for a command from personal computer | Master Unit | High | Low | High | High |
| | Slave Unit | High | Low | High | High |
| Transmitting measurement data | Master Unit | High | Low | Low | Low |
| | Slave Unit | Low | Low | Low | Low |
| Completing transmission of measurement data | Master Unit | High | High | High | High |
| | Slave Unit | High | High | High | High |
| Completing transmission of whole data | Master Unit | High | Low | High | High |
| | Slave Unit | High | Low | High | High |

As shown above, the transmitting-line-abnormality detecting means of the slave unit 20S detects "High" signal value of Input transmission-completion signal S2 which ordinarily should be "Low" in waiting for a command from the personal computer, and output error signal to other units such as the personal computer 60.

This means either one of failing to output the transmission-completion signal S2 due to power supply being shut down, or the transmitting-line 714 of the cable 71 connecting the relaying unit being cut off.

After completing transmission of the measurement data S1 of the preceding slave unit 40S, the identifying-line-abnormality detecting means of the slave unit 40S detects "High" transmission-identifying signal END and outputs an error signal to other units such as the personal computer 60, though the slave unit 20S is connected to succeeding stage.

This means that the measurement data S1 is transmitted from all of the relaying units recognized by the data-transmission-identifying-line 713 and the data-transmission-identifying-line 713 is closed at this stage.

The personal computer 60 determines a breakdown at the cable 71 connecting the (second stage) slave unit 40S and the (third stage) slave unit 20S based on the result detected by the transmitting-line-abnormality detecting means and the identifying-line-abnormality detecting means, and displays the result.

On the other hand, if the power supply of the (second stage) slave unit 40S is shut off, the transmitting-line-abnormality detecting means of the (third stage) slave unit 20S detects "High" Input transmission-completion signal S2, similarly to the above, as shown in FIG. 12. However, the identifying-line-abnormality detecting means does not detect abnormality.

Accordingly, the personal computer 60 determines the cause of the breakdown other than aforementioned cable cutoff, and a shutoff of the preceding slave unit 40S or a breakdown equivalent thereto is detected.

Incidentally, a cutoff of the RS232C cable 72 between the personal computer 60 and the master unit 20M can be directly recognized by the personal computer 60, and aforementioned malfunction detecting means is not necessary.

Furthermore, a cutoff of the command-data-line 711 and the measurement-data line 712 can be individually monitored by the personal computer 60 since the personal computer 60 and the respective relaying unit 20M, 20S and 40S are connected in parallel, so aforementioned malfunction detecting means is not necessary, too.

(Effect)

According to the aforementioned embodiment, following effect can be obtained.

Respective relaying unit 20M, 20S and 40S has the address-transmitting means, and the address data ID (1–6) is set by adding the number of the digital dial gauge 10 connected individually and is transmitted to succeeding relaying unit 20S and 40S. So, the number of the digital dial gauge 10 connected to the respective relaying unit 20M, 20S and 40S can be recognized automatically by the address data ID (1–6).

Accordingly, what is necessary to be done by the personal computer is to secure memory area in accordance with the address data ID (6) transmitted by the last relaying unit 40. By utilizing spreadsheet software etc., automation of address setting is possible.

Due to the aforementioned structure of the measurement data processing unit 1, the number of the digital dial gauge 10 can be increased only by connecting a new slave unit 20S or 40S to the relaying unit 40S disposed at the end of the serially connected plurality of the relaying unit 20M, 20S and 40S, and connecting a digital dial gauge 10 to the newly connected slave unit 20S or 40S.

And, since the aforementioned measurement data processing unit conducts address setting automatically, the address of the memory area of the personal computer 60 is not necessary to be reset, thereby further facilitating expansion of the unit.

Since the slave unit 40S and 20S get the address data ID on condition of receiving the transmission-completion signal S2 from the preceding relaying unit 20M and 40S, precise and secure address data ID can be transmitted to the personal computer 60.

And since the transmission completion command S2 is send only to the adjacent succeeding relaying unit 40S and 20S, the relaying unit does not mistakenly acquire the address data, thereby achieving reliable receipt of the address data ID (1–6).

Further, since the address data ID (1–6) is transmitted through the measurement-data line 712 connecting each relaying unit 20M, 20S and 40S in parallel to the personal computer 60, the address data ID (1–6) can be easily acquired by the personal computer 60. And connecting line structure of the measurement data processing unit 1 can be simplified by utilizing the measurement-data line 712 which transmits measurement data when measuring.

The execution means of the personal computer 60 is actuated on condition that the personal computer 60 receives the transmission-identifying signal END. So the measurement data S1 can be collected and processed automatically after completing address setting of the personal computer 60, and the series of process from address setting and initiation of measurement can be further simplified.

Each relaying unit 20M, 20S and 40S has transmitting-line-abnormality detecting means. So, when an abnormality is caused on the preceding relaying unit 40S or cable 71, the adjacent succeeding relaying unit 20S detects the abnormality, and immediately specifying the malfunction part of the measurement data processing unit 1.

Further, since the malfunction detecting system of the aforementioned measurement data processing unit 1 has the transmitting-line-abnormality detecting means and the identifying-line-abnormality detecting means, it can be securely identified whether the preceding relaying unit 40S is broken down or the cable 71 is cut off.

The error signal output portion is provided to the transmitting-line-abnormality detecting means and the identifying-line-abnormality detecting means, the malfunction of the measurement data processing unit can be collectively detected by the personal computer 60.

(Modification)

The scope of the present invention is not limited to aforementioned embodiment, but includes modifications described below.

Only four relaying units 20M, 20S and 40S in total are serially connected in the aforementioned embodiment, however, more relaying unit may be connected.

One or two digital dial gauges 10 can be connected to the relaying unit 20M, 20S and 40S, however, a relaying unit to which more digital dial gauge 10 can be connected may be used.

In short, the number of the digital dial gauge 10 provided to the measurement data processing unit 1 can be determined in accordance with the setting of obtainable memory area on the personal computer 60.

The measurement data S1 in the aforementioned embodiment is an electric signal obtained by converting slide displacement amount of the spindle 12. However, the measurement data processing unit according to the present invention may be applied to a distortion gauge which converts dynamic distortion amount of a work into an electric signal.

Though aforementioned transmission-completion signal S2 and transmission-identifying signal S3 are a voltage output signal consisted of "Low" and "High", they may be current output signal, or digital signal. In short, any signal is possible so long as it can be determined whether the measurement data S1 is transmitted or not by the signal.

The other specific structure and configuration in practically applying the present invention can be selected within the range possible to attain the object of the present invention.

What is claimed is:

1. A measurement data processing unit for use with at least one measuring device, comprising:
    a plurality of relaying units to which the at least one measuring device can be connected, each relaying unit being serially connected to the preceding and succeeding relaying unit through a cable;
    processing means for collecting and processing the measurement data transmitted from each relaying unit;
    a measurement-data line and a command-data-line connecting each relaying unit to said processing means in parallel;
    a transmitting-line connecting each adjacent relaying unit to report completion of data-transmission of the preceding relaying unit to the succeeding relaying unit in sequence;
    wherein each relaying unit has a transmitting-line-abnormality detecting means for detecting an abnormality of at least one of the preceding relaying unit and the cable from a condition of the transmission-completion signal;
    a data-transmission-identifying-line connecting each relaying unit to said processing means in parallel for transmitting a transmission-identifying signal to switch a signal value on condition that the measurement data is transmitted from all of the relaying units;
    wherein each relaying unit is provided with an identifying-line-abnormality detecting means for detecting an abnormality of at least one of the other relaying units and the cable from the condition of the transmission-identifying signal; and
    wherein which one of the preceding relaying unit and the cable is abnormal is determined by combining a detected condition of the transmitting-line-abnormality detecting means and the identifying-line-abnormality detecting means.

2. The measurement data processing unit according to claim 1, wherein an abnormality of the cable connecting the relaying unit and the other relaying unit preceding thereto is determined when a transmission-completion signal is detected by the transmitting-line-abnormality detecting means of any one of the relaying units in waiting for a command from the processing means, and when the transmission-identifying signal reporting completion of transmitting all of the measurement data is detected by the identifying-line-abnormality detecting means of the preceding relaying unit in transmitting a measurement data from the preceding relaying unit.

3. A measurement data processing unit for use with at least one measuring device, comprising:
    a plurality of relaying units to which the at least one measuring device can be connected, each relaying unit having an address-transmitting means for setting an address data by adding a number of measuring devices connected to the respective relaying unit to another address data transmitted from a preceding relaying unit, and for transmitting the newly set address data to a succeeding relaying unit;
    processing means for collecting and processing the measurement data transmitted from said relaying units, the plurality of relaying units being connected to the processing means in sequence;
    a measurement-data line and a command-data-line connecting each relaying unit to said processing means in parallel;
    a transmitting-line connecting each adjacent relaying unit to report completion of data-transmission of the preceding relaying unit to the succeeding relaying unit in sequence;
    wherein said address-transmitting means includes a data-acquiring means for acquiring the address data of the preceding relaying unit through the measurement-data line, a setting means for setting an individual address data by adding the number of measuring devices connected to each relaying unit, and a transmitting means for transmitting the newly set address data to the measurement-data line and for transmitting a transmission-completion signal to the succeeding relaying unit through the transmitting-line after transmitting the newly set address data;
    wherein said data-acquiring means acquires the address data under the condition that the transmission-completion signal is received from the preceding relaying unit through the transmitting-line;
    wherein each relaying unit has a transmitting-line abnormality detecting means for detecting an abnormality of at least one of the preceding relaying unit and a cable connecting each relaying unit to the preceding and succeeding relaying unit from a condition of the transmission-completion signal;
    a data-transmission-identifying-line connecting each relaying unit to said processing means in parallel for transmitting a transmission-identifying signal to switch a signal value on condition that the measurement data is transmitted from all of the relaying units;
    wherein each relaying unit is provided with an identifying-line-abnormality detecting means for detecting the abnormality of at least one of other relaying units and the cable from the condition of the transmission-identifying signal; and
    wherein which one of the preceding relaying unit and the cable is abnormal is determined by combining a detected condition of the transmitting-line-abnormality detecting means and the identifying-line-abnormality detecting means.

4. The measurement data processing unit according to claim 2, wherein said processing means has an execution means for collecting and processing the measurement data under the condition that the transmission-identifying is received from all of the relaying units.

5. A measurement data processing unit for use with at least one measuring device, comprising:
    a plurality of relaying units to which the at least one measuring device can be connected, each relaying unit having an address-transmitting means for setting an address data by adding a number of measuring devices connected to the respective relaying unit to another address data transmitted from a preceding relaying unit, and for transmitting the newly set address data to a succeeding relaying unit, each relaying unit being serially connected to the preceding and succeeding relaying unit through a cable;
    processing means for collecting and processing the measurement data transmitted from said relaying units, the plurality of relaying units being connected to the processing means in sequence, one of the serially connected relaying units being connected to the processing means;

a measurement-data line and a command-data-line connecting each relaying unit to said processing means in parallel;

a transmitting-line connecting each adjacent relaying unit to report completion of data-transmission of the preceding relaying unit to the succeeding relaying unit in sequence;

wherein said address-transmitting means includes a data-acquiring means for acquiring the address data of the preceding relaying unit through the measurement-data line, a setting means for setting an individual address data by adding the number of measuring devices connected to each relaying unit, and a transmitting means for transmitting the newly set address data to the measurement-data line and for transmitting a transmission-completion signal to the succeeding relaying unit through the transmitting-line after transmitting the newly set address data;

wherein said data-acquiring means acquires the address data under the condition that the transmission-completion signal is received from the preceding relaying unit through the transmitting-line;

wherein each relaying unit has a transmitting-line abnormality detecting means for detecting an abnormality of at least one of the preceding relaying unit and the cable from a condition of the transmission-completion signal;

a data-transmission-identifying-line connecting each relaying unit to said processing means in parallel for transmitting a transmission-identifying signal to switch signal value on condition that the measurement data is transmitted from all of the relaying units;

wherein each relaying unit is provided with an identifying-line-abnormality detecting means for detecting the abnormality of at least one of other relaying units and the cable from the condition of the transmission-identifying signal; and wherein which one of the preceding relaying unit and the cable is abnormal is determined by combining a detected condition of the transmitting-line-abnormality detecting means and the identifying-line-abnormality detecting means.

6. The measurement data processing unit according to claim 1, wherein said processing means has an execution means for collecting and processing the measurement data under the condition that the transmission-identifying signal is received from all of the relaying units.

* * * * *